(12) United States Patent
Li

(10) Patent No.: US 11,553,707 B2
(45) Date of Patent: Jan. 17, 2023

(54) ROTARY ANIMAL REPELLING DEVICE

(71) Applicant: Zeyu Li, Nanjing (CN)

(72) Inventor: Zeyu Li, Nanjing (CN)

( * ) Notice: Subject to any disclaimer, the term of this patent is extended or adjusted under 35 U.S.C. 154(b) by 519 days.

(21) Appl. No.: 16/711,466

(22) Filed: Dec. 12, 2019

(65) Prior Publication Data
US 2020/0323194 A1    Oct. 15, 2020

(30) Foreign Application Priority Data
Apr. 12, 2019  (CN) .......................... 201920500514.1

(51) Int. Cl.
*A01M 29/10* (2011.01)
*A01M 29/16* (2011.01)
*G01J 5/00* (2022.01)

(52) U.S. Cl.
CPC ............ *A01M 29/10* (2013.01); *A01M 29/16* (2013.01); *G01J 5/0025* (2013.01)

(58) Field of Classification Search
CPC ............................. A01M 29/10; A01M 29/16
See application file for complete search history.

(56) References Cited

U.S. PATENT DOCUMENTS

| | | | | |
|---|---|---|---|---|
| 5,901,491 A | * | 5/1999 | Caldwell | A01M 31/06 43/2 |
| 8,151,875 B2 | * | 4/2012 | Caldwell | E21B 43/16 166/227 |
| 9,072,288 B1 | * | 7/2015 | Thomas | A01M 29/10 |

FOREIGN PATENT DOCUMENTS

CN    108094402 A    6/2018

* cited by examiner

*Primary Examiner* — Joshua J Michener
*Assistant Examiner* — Nicole Paige Maccrate

(57) ABSTRACT

A rotary animal repelling device, including: a housing, which includes a fixed body part and a head above the body part, and a mounting disc is fixedly provided on an inner periphery of a cavity of the head. A motor is located on the mounting disc, a rotating shaft extends through the mounting disc and is fixed to a side of the body part facing the head. The mounting disc has a sounder and a laser light, and the sounder and the laser light are coupled to the motor by transmission line, respectively. The laser light extends to outside of the head, the mounting disc has a radar sensor to detect an approach of animals and a control main board communicatively coupled to the radar sensor, the control main board is communicatively coupled to the motor, and the control main board has a control switch extending outside of the housing.

12 Claims, 4 Drawing Sheets

ROTARY ANIMAL REPELLING DEVICE

TECHNICAL FIELD

The present disclosure relates to the technical field of repelling rodents and birds, and in particular to a rotary animal repelling device.

BACKGROUND

A conventional animal repelling device is mounted in an owl-shaped housing, and the owl-shaped housing is divided into a head and a body part. A motor driving the rotation of the owl-shaped housing is mounted in the body part of the owl-shaped housing, a sounder, a radar sensor, and a laser light are all provided in the head of the housing, the motor is coupled to the sounder and the laser light through two transmission lines, respectively, and the radar sensor is communicatively coupled to the motor through a control main board. When the radar sensor detects that a rat is approaching, the radar sensor feeds back information, to the control main board, which controls the motor to start, and the rotating shaft of the motor controls the head of the owl to rotate, the sounder emits an owl's call, and the laser light emits a laser ray in order to drive rodents and birds away. However, since the motor has relatively large distances between the sounder and the laser light, when the head of the owl-shaped housing is rotating, the transmission lines are twisted along with the rotation of the head of the owl-shaped housing. After long-term twisting, the transmission lines are susceptible to being twisted and broken, which shortens the service life of the transmission line.

SUMMARY

Accordingly, it is necessary to provide a rotary animal repelling device reducing the possibility of twisting and breaking the transmission line caused by rotation of transmission line driven by the rotating head of the housing, thereby extending the service life of the transmission line.

A rotary animal repelling device, which includes a housing. The housing includes a fixed body part and a head provided above the body part. A cavity is defined in the head, and a mounting disc is fixedly provided on an inner periphery of the cavity of the head. A motor is provided on the mounting disc, a rotating shaft is provided through the mounting disc and is fixedly connected to a side of the body part facing the head. The mounting disc is provided with a sounder and a laser light, and the sounder and the laser light are coupled to the motor through a transmission line, respectively. The laser light is exposed to an outer side of the housing of the head, the mounting disc further has a radar sensor used to detect an approach of rodents and birds, and a control main board communicatively coupled to the radar sensor. The control main board is further communicatively coupled to the motor, and the control main board has a control switch extending to the outer side of the housing.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

Reference Number: 1 housing; 2 body part; 3 head; 4 cavity; 5 mounting disc; 6 motor; 7 rotating shaft; 8 sounder; 9 laser light; 10 radar sensor; 11 control main board; 12 control switch; 13 limiting block; 14 arc-shaped groove; 15 protruding block; 16 latching groove; 17 first screw; 18 solar panel; 19 battery; 20 transmission line; 21 mounting block; 22 second block; 23 sleeve; 24 amplification hole; 25 latching block; 26 fixing board; 27 through hole; 28 heat dissipation hole; 29 fixing post; 30 latching hole; 31 latching post.

DETAILED DESCRIPTION OF THE EMBODIMENTS

The present disclosure will be further described in detail below with reference to the drawings.

Figure 1:
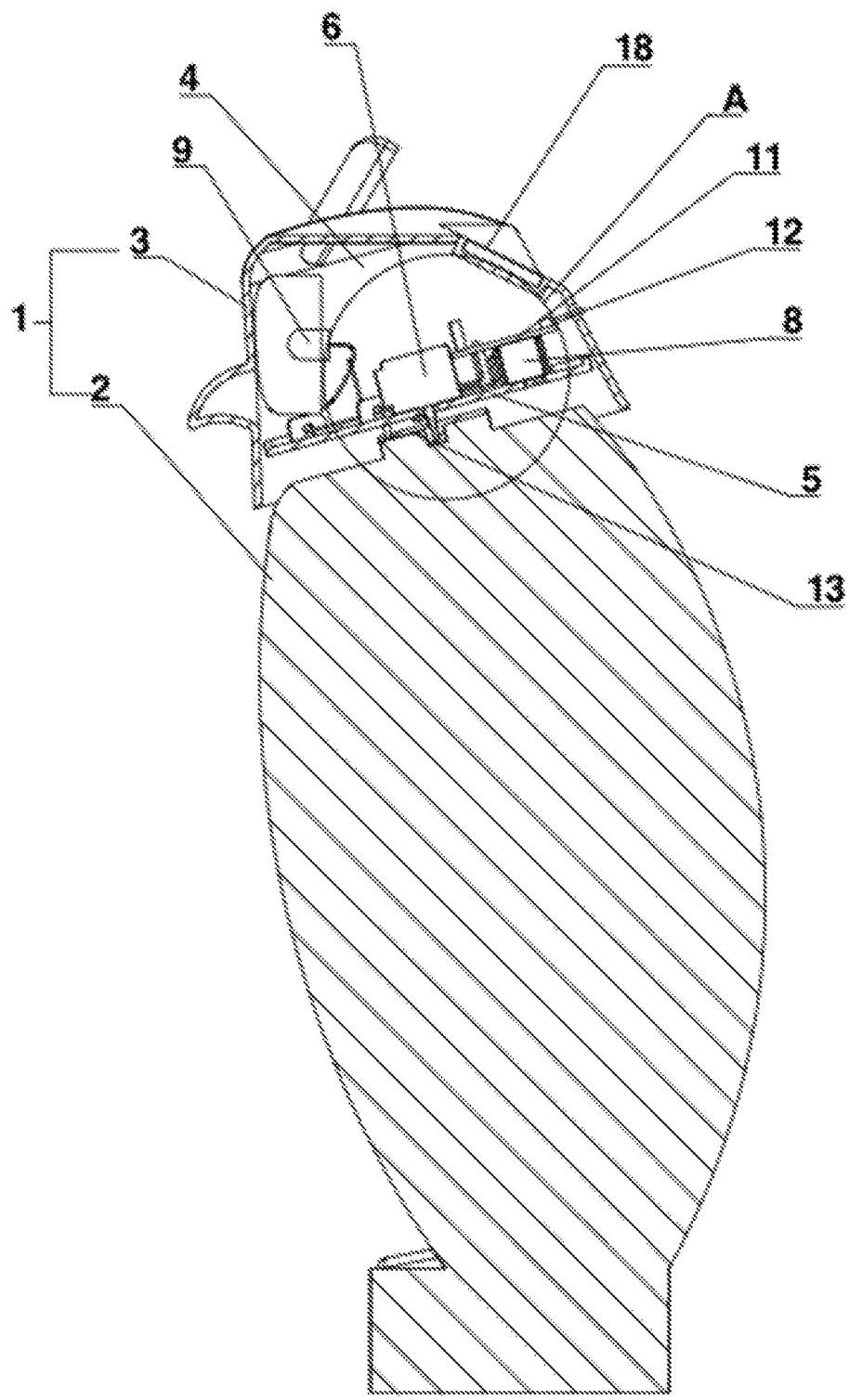
FIG. 1 is a cross-sectional view of the housing showing its components in the cavity of the head according to an embodiment.
Figure 2:
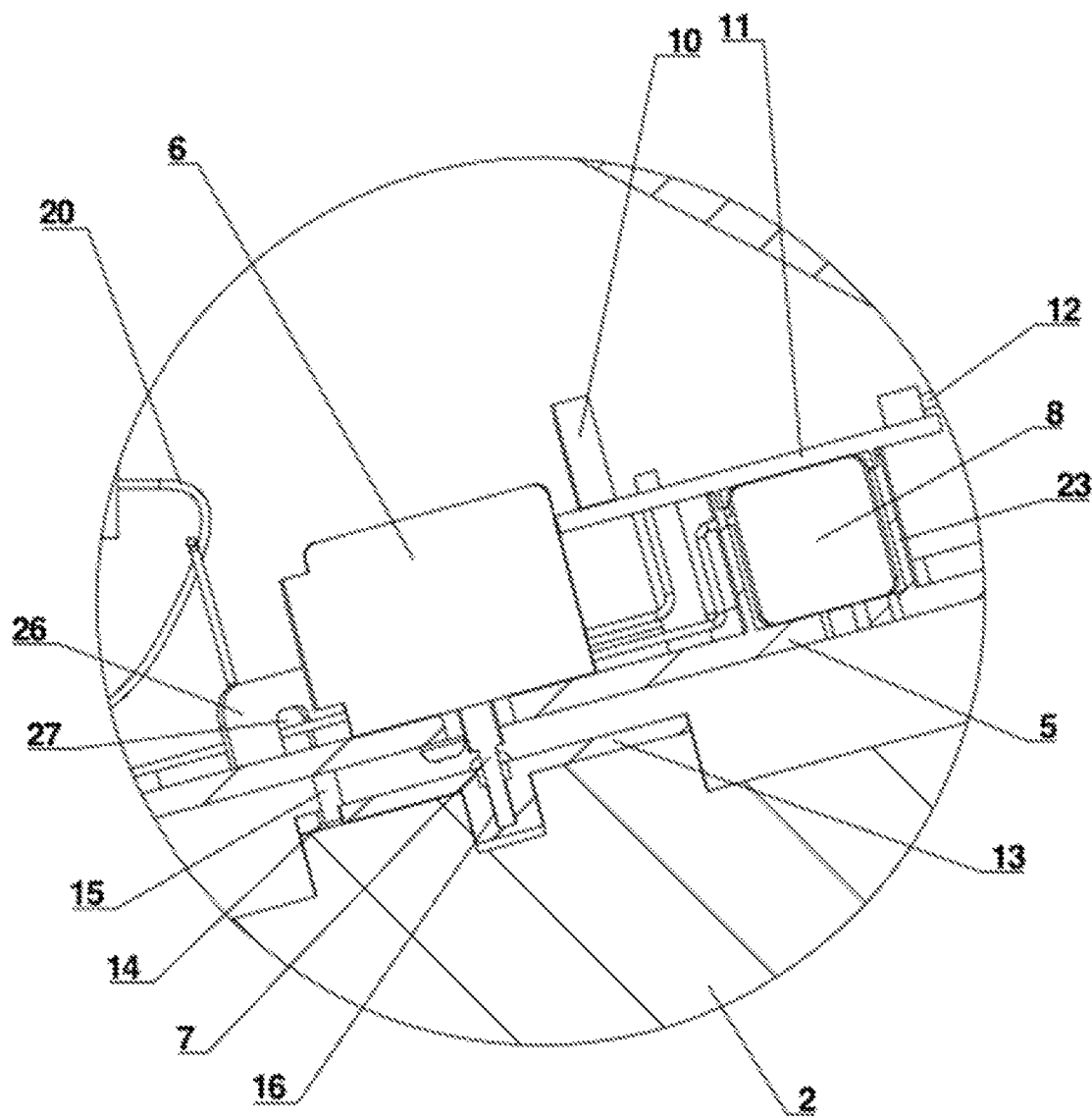
FIG. 2 is an enlarged view of the circle A in FIG. 1.
Figure 3:
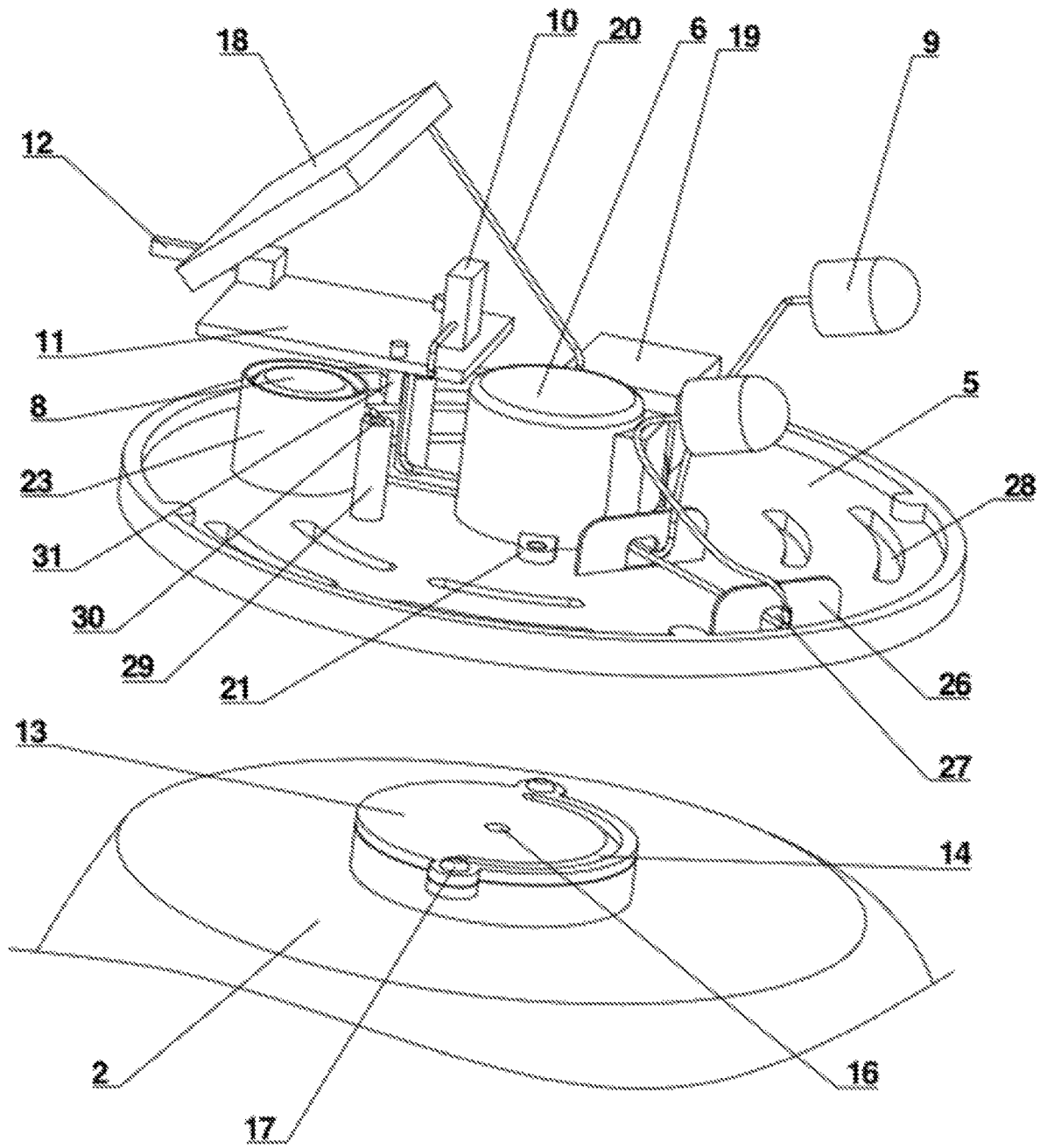
FIG. 3 is a perspective view of the components in the cavity of the head and the limiting block of the body part.
Figure 4:
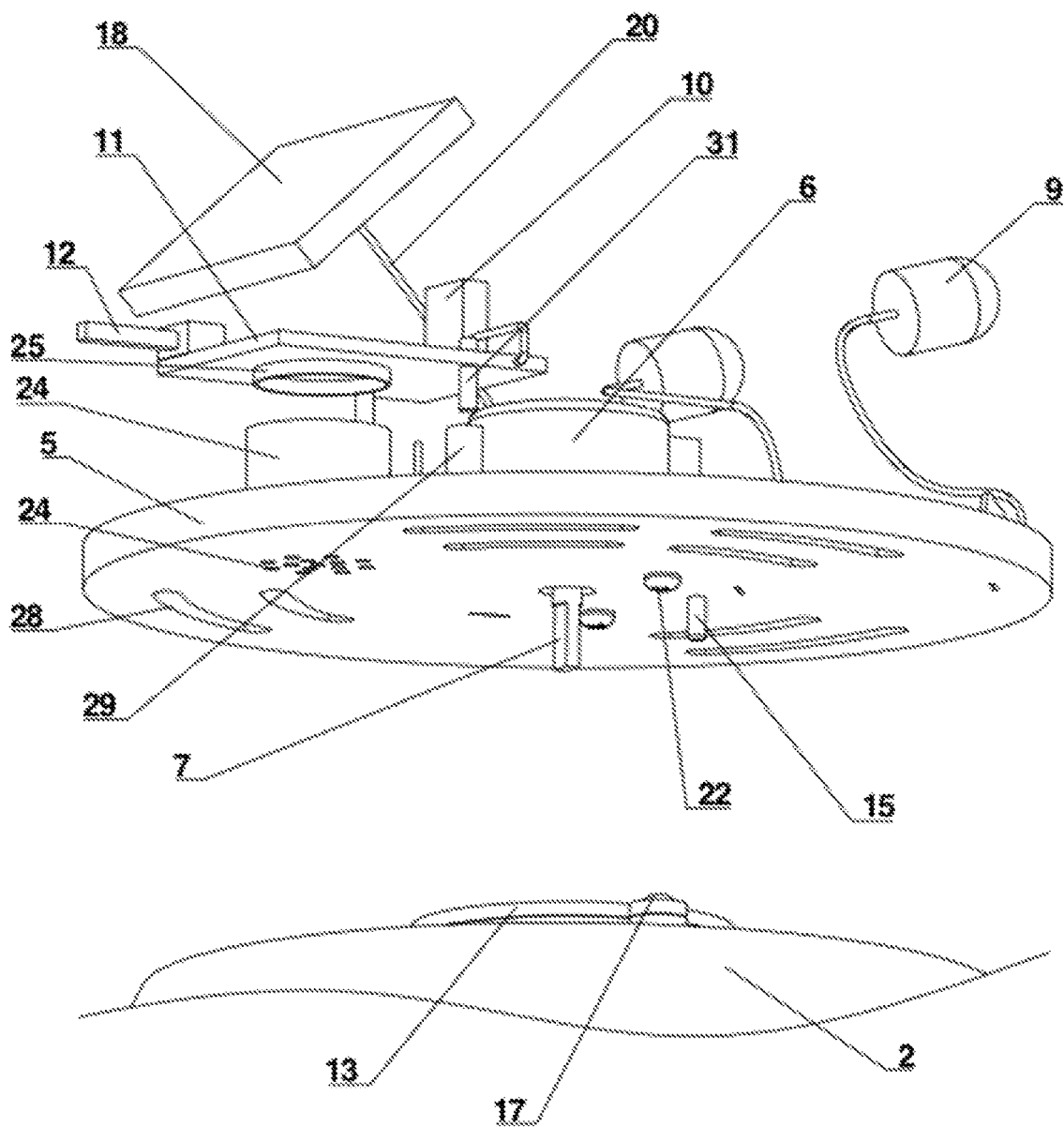
FIG. 4 is another perspective view of the components in the cavity of the head and the limiting block of the body part.

Embodiment: according to FIGS. 1 and 2, a rotary animal repelling device includes a housing 1. In the illustrated embodiment, the housing 1 is owl-shaped. Since owls are nature enemies of rats or the like, setting the housing 1 into the shape of an owl is conducive for animals to mistakenly think that the device is an owl and not dare to approach after seeing the housing 1, thereby repelling the rats. The housing 1 includes a fixed body part 2 and a head 3 provided above the body part 2. A cavity 4 is defined in the head 3, and a mounting disc 5 is adhered on an inner periphery of the cavity 4 of the head 3 by glue. The mounting disc 5 is provided with a motor 6, and a sidewall of the motor 6 facing the mounting disc 5 is fixedly welded with a mounting block 21. The mounting block 21 is connected to the mounting disc 5 by a second screw 22 (as shown in FIG. 4). The mounting disc 5 is has a heat dissipation hole 28 (as shown in FIG. 3), and the rotating shaft 7 extends through the mounting disc and is fixedly connected to the body part 2 of the housing 1. The setting of heat dissipation holes 28 makes it easier for the heat generated during the operation of the motor 6 to be dissipated through the heat dissipation holes 28, reducing the possibility of burning down the motor 6 caused by the high temperature in the cavity 4 due to the air-tightness of the head 3.

According to FIG. 3, a limiting block 13 is provided on the side of the body part 2 facing the head 3, an arc-shaped groove 14 is defined on a side of the limiting block 13 facing the mounting disc 5. A protruding block 15 is glued to a side of the mounting disc 5 facing the limiting block 13, as shown in FIG. 1. A latching groove 16 is defined on the side side of the limiting block 13 facing the mounting disc 5. As shown in FIG. 4, a cross-section of an end of the rotating shaft 7 of the motor 6 facing the latching groove 16 is a polygon, a cross-section of the latching groove 16 is a polygon corresponding to the rotating shaft 7. In the illustrated embodiment, the cross-sections of the rotating shaft 7 and the latching groove 16 are both rectangular. During installation, the operator firstly mounts the motor 6 on the mounting disc 5 through the cooperation of the mounting block 21 and the second screw 22 (FIG. 4). Secondly screws the limiting block 13 to the side of the body part 2 of the housing 1 facing the head 3 by the first screw 17. Then, the rotating shaft 7 of the motor 6 is latched in the latching groove 16 in the limiting block 13, and the protruding block 15 is restricted in the arc-shaped groove 14 of the limiting block 13, thereby splicing the head 3 and the body part 2 of the housing 1 together.

In the illustrated embodiment, the polygon-sectioned rotating shaft 7 not only ensures that the rotating shaft 7 of the motor 6 is detachably connected to the body part 2, but also ensures the both polygon-sectioned rotating shaft 7 and the latching groove 16 can be latched, preventing the rotating shaft 7 from relatively rotating in the latching groove 16 during its rotation and driving the head 3 to waggle.

Since the motor 6 is detachably connected to the mounting disc 5, which is convenient for the operator to install the motor 6 on or remove the motor 6 from the body part 2 of the housing 1, therefore the operation is simple and convenient.

Referring to FIG. 3, during the operation of the motor 6, the rotating shaft 7 (in FIG. 4) rotates, and since the rotating shaft 7 is restricted in the limiting block 13, the motor 6 drives the mounting disc 5 and the head 3 of the housing 1 to rotate, at this time the protruding block 15 on the mounting disc 5 makes a circular movement along the arc-shaped groove 14 on the limiting block 13. When the protruding block 15 reaches a limitation position in the arc-shaped groove 14, the position of the mounting disc 5 is limited, and the motor 6 drives the mounting disc 5 to move in an opposite direction, until the protruding block 15 reaches another limitation position in another end of the arc-shaped groove 14. Repeating the movements in this way causes the head 3 of the housing 1 to rotate back and forth, thereby simulating the "owl" that keeps rotating the head 3, thereby scaring away animals such as rats. An outer side of the head 3 of the housing 1 is provided with a solar panel 18, the mounting disc 5 is further provided with a battery 19 used to store an electrical energy on the solar panel 18, and the battery 19 powers the motor 6 through the transmission line 20. The solar panel 18 absorbs solar energy, and converts the solar energy into electrical energy to be stored in the battery 19 to power the motor 6, it meets the requirements of energy conservation and environmental protection.

Referring to FIG. 3, the mounting disc 5 is installed with a sounder 8 and a laser light 9, and the sounder can emit an owl's call. The sounder 8 and the laser light 9 are coupled to the motor 6 through a transmission line 20, respectively. In the illustrated embodiment, two laser lights 9 are provided, and the laser lights 9 are located in the eye position of the owl-shaped housing 1 and extends out of the housing 1, respectively (as shown in FIG. 1). The mounting disc 5 is further provided with a radar sensor 10 to detect an approach of rats and a control main board 11 communicatively coupled to the radar sensor 10. The control main board 11 is communicatively coupled to the motor 6, and the control main board 11 is provided with a control switch 12 extending to the outer side of the housing 1.

Referring to FIG. 3, during operation, the operator starts the main board 11 through the control switch 12. When the radar sensor 10 detects that a rat is approaching the housing 1, the radar sensor 10 feeds back information to the control main board 11, which controls the motor 6 to start, the motor 6 drives the head 3 of the housing 1 to rotate, the sounder 8 emits an owl's call, and the laser light 9 emits a laser ray, so as to create an illusion that an "owl" is nearby, thereby driving rats away. During the operation, the mounting disc 5 and the head 3 rotate along with the motor 6 as a whole, such that the transmission line 20 on the mounting disc 5 remains relatively stationary with respect to the mounting disc 5, reducing the possibility of the transmission line 20 being twisted and broken due to the non-stop rotation of the head 3, extending the service life of the transmission line 20. A fixing board 26 is adhered to the mounting disc 5, the fixing board 26 is defined with a through hole 27 allowing the transmission line 20 to extend through, and the transmission line 20 extends through and is restricted in the through hole 27 of the fixing board 26. With this arrangement, the transmission line 20 is arranged neatly on the mounting disc 5.

Referring to FIG. 3, a side of the mounting disc 5 away from the body part 2 of the housing 1 is adhered with a sleeve 23, and the sounder 8 is received in the sleeve 23. A plurality of amplification holes 24 are provided on the mounting disc 5 within an inner periphery of the sleeve 23, a latching block 25 is adhered to an end of the control main board 11 facing the sleeve 23, and the latching block 25 engages with an inner periphery of an opening end of the sleeve 23. Two fixing posts 29 are adhered on the mounting disc 5 around the outer periphery of the sleeve 23 below the control board 11. End of the fixing post 29 facing the control board 11 has a latching hole 31, and the outer diameter of the latching post 31 is the same as the inner diameter of the latching hole 30. During installation, the sounder 8 is received in the sleeve 23, then the latching block 25 of the control main board 11 engages with the opening end of the sleeve 23, the latching post 31 of the control main board 11 engages with the latching hole 30 of the fixing post 29, then the sounder 8 is restricted between the control main board 11 and the mounting disc 5. According to this configuration, when the sounder 8 or the control main board 11 fail, it is convenient for the operator to detach the control main board 11 or the sounder 8 from the sleeve 23 for maintenance.

In summary, the present disclosure reduces the possibility of twisting the transmission line during the rotation of the head of the housing, thereby reducing the possibility of breaking the transmission line due to a long-term twisting. It is also convenient for the operator to install and remove the components installed in the housing.

Operation process: during operation, firstly the operator starts the control main board 11 by the control switch 12. When the radar sensor 10 detects that a rodent is approaching the owl-shaped housing 1, the radar sensor 10 feeds back information to the control main board 11, which controls the motor 6 to start, the motor 6 drives the head 3 of the housing 1 to repeatedly rotate along the arc-shaped groove 14 of the limiting block 13. The sounder 8 emits an owl's call, and the laser lights 9 emit laser rays through the eye positions of the head 3 of the owl-shaped housing 1, thereby driving animals away and achieving the animal repellent object.

The specific embodiments are only explanations of the present disclosure, and the embodiments are not intended to limit the present disclosure. Rather, various modifications may be made in the details within the scope and range of equivalents of the claims and without departing from the present disclosure.

What is claimed is:

1. A rotary animal repelling device, comprising: a housing, wherein the housing comprises a body part fixedly arranged and a head provided above the body part; a cavity is defined in the head, and a mounting disc is fixedly provided on an inner periphery of the cavity of the head; a motor is provided on the mounting disc, a rotating shaft is provided through the mounting disc and an end of the rotating shaft is fixedly connected to a side of the body part facing the head; the motor drives the rotating shaft to rotate, such that the body part rotates relative to the mounting disc; the mounting disc is provided with a sounder and a laser light, and the sounder and the laser light are coupled to the motor via a transmission line, respectively; the laser light is exposed to an outer side of the head of the housing, the mounting disc is further provided with a radar sensor configured to detect an approach of rodents and birds and a control main board communicatively coupled to the radar sensor, the control main board is further communicatively coupled to the motor, and the control main board is provided with a control switch extending to the outer side of the head of the housing.

2. The rotary animal repelling device according to claim 1, wherein a sidewall of the motor facing the mounting disc is fixedly connected to a mounting block, and the mounting block is connected to the mounting disc via a second screw.

3. The rotary animal repelling device according to claim 2, wherein a side of the mounting disc away from the body part of the housing is fixedly provided with a sleeve, the sounder is received in the sleeve, a plurality of amplification holes are provided on the mounting disc within an inner periphery of the sleeve, a latching block is fixedly connected to an end of the control main board facing the sleeve, and the latching block is latched in an inner periphery of an opening end of the sleeve.

4. The rotary animal repelling device according to claim 3, wherein a fixing posts is provided on the mounting disc around an outer periphery of the sleeve below the control board, an end of the fixing post facing the control board is defined with a latching hole, and an outer diameter of a latching post is the same as an inner diameter of the latching hole.

5. The rotary animal repelling device according to claim 1, wherein a limiting block is provided on the side of the body part facing the head, an arc-shaped groove is defined on a side of the limiting block facing the mounting disc, a protruding block is fixedly connected to a side of the mounting disc facing the limiting block; the protruding block slides in the arc-shaped groove; a latching groove is defined on the side of the limiting block facing the mounting disc, and the rotating shaft of the motor is latched in the latching groove.

6. The rotary animal repelling device according to claim 5, wherein a cross-section of the end of the rotating shaft is a polygon, a cross-section of the latching groove is a polygon corresponding to the end of the rotating shaft.

7. The rotary animal repelling device according to claim 5, wherein the limiting block is threadly connected to the side of the body part facing the head via a first screw.

8. The rotary animal repelling device according to claim 5, when the protruding block reaches a limitation position in the arc-shaped groove, the motor drives the mounting disc to rotate in an opposite direction, until the protruding block reaches an other limitation position in an other end of the arc-shaped groove.

9. The rotary animal repelling device according to claim 1, wherein the outer side of the head of the housing is provided with a solar panel, the mounting disc is further provided with a battery configured to store an electrical energy generated by the solar panel, and the battery powers the motor via the transmission line.

10. The rotary animal repelling device according to claim 1, wherein a fixing board is fixedly connected to the mounting disc, the fixing board is defined with a through hole configured to allow the transmission line to extend through, and the transmission line extends through and is redistricted in the through hole of the fixing board.

11. The rotary animal repelling device according to claim 1, wherein the mounting disc is defined with a heat dissipation hole.

12. The rotary animal repelling device according to claim 1, during a rotation of the mounting disc, the transmission line on the mounting disc remains relatively stationary with respect to the mounting disc.

\* \* \* \* \*